Patented June 9, 1931

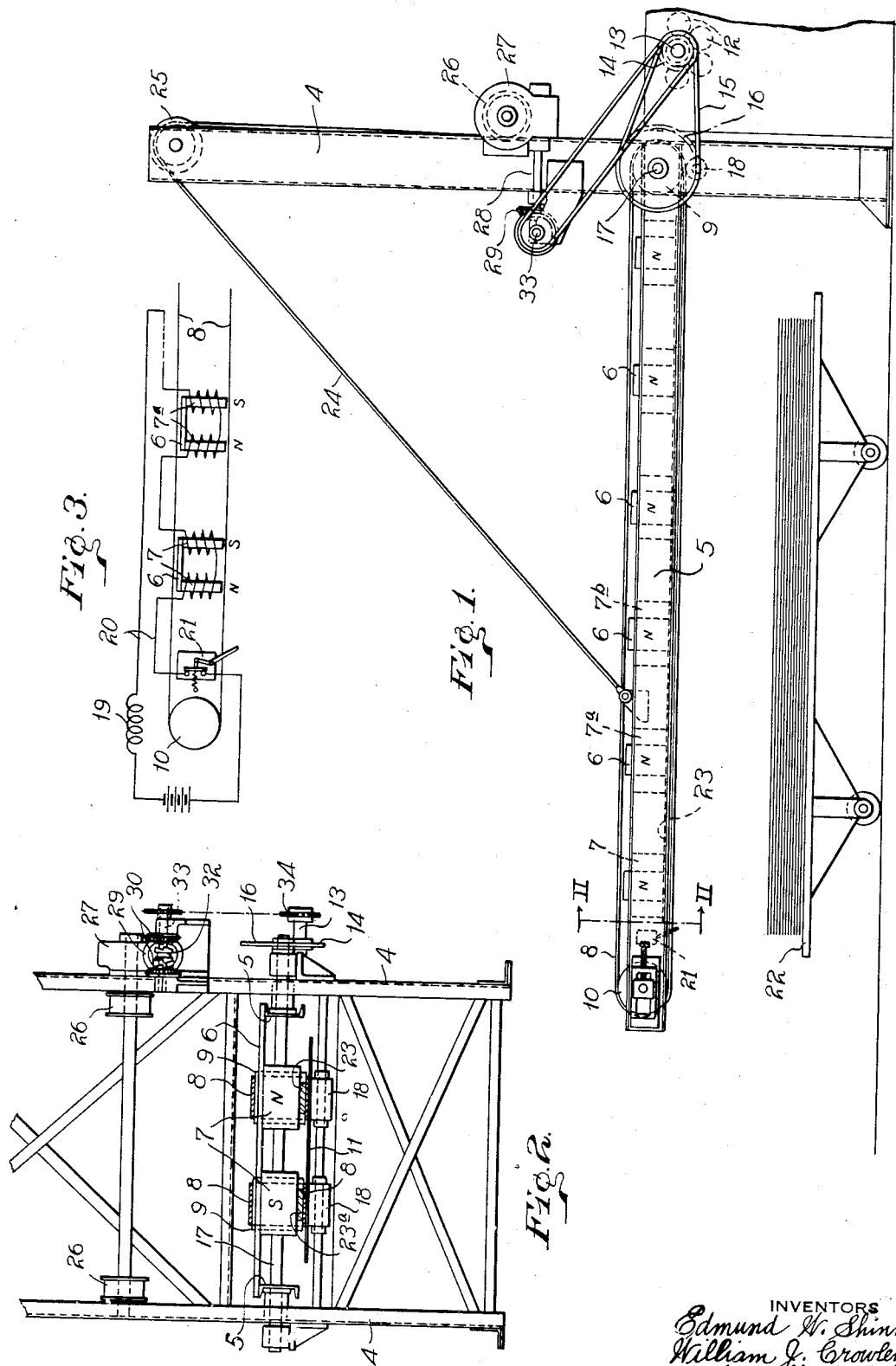

1,809,076

UNITED STATES PATENT OFFICE

EDMUND W. SHINN, WILLIAM J. CROWLEY, AND ROBERT H. SCOTT, OF CUMBERLAND, MARYLAND

MATERIAL HANDLING APPARATUS

Application filed April 12, 1929. Serial No. 354,550.

Our invention relates to a method and apparatus for handling material such as metal sheets, although it is suitable for use in connection with the handling of other articles.

One object of our invention is to provide an improved method and means for handling steel sheets or the like and for piling or stacking the same evenly and without causing sheets to slide upon one another.

Another object of our invention is to provide a magnetic conveyer that is particularly suitable for metal sheets of considerable area, and also thin sheets of metal.

Still another object of our invention is to provide conveyer apparatus of generally simplified and improved form.

One form which our invention may take is shown in the accompanying drawings, wherein Figure 1 is a side elevational view of a magnetic conveyer; Fig. 2 is a view taken on the line II—II of Fig. 1, and Fig. 3 is a diagrammatic view showing the electrical circuit for the magnets.

The conveyer structure includes upright frame members 4 and generally horizontally extending channel members 5 which are pivotally mounted upon the upright 4, so that the conveyer proper may have oscillatory movement in a vertical plane, as hereinafter explained.

Cross pieces 6 that are secured to the channel members 5 serve to connect such members in unitary relation and to serve as yoke members for the magnets 7, 7a, 7b, etc., each magnet comprising parallel coils, the cores of which are secured to and supported by the yokes or cross pieces 6 in any suitable manner. The magnets 7, 7a, 7b, etc., are disposed between the upper and lower flights of conveyer belts 8 that are driven by pulleys 9 at the inner end of the conveyer frame and at the outer end of the frame pass around guide pulleys 10.

The magnets serve to hold metal sheets 11 against the under faces of the lower belt flights 8, so that as such belts are driven, the metal sheets will be carried thereby from the receiving end of the conveyer to the discharge end thereof. The sheets are shown as delivered to the conveyer from feed rolls 12 that are driven from a suitable source of power, and one of which has driving connection with a shaft 13 that carries a sprocket 14. The sprocket 14 through a chain 15 drives a sprocket 16 that is secured to a shaft 17 which carries the driving pulley 9 for the belts 8. In this manner, the delivery of sheets from the feed rolls 12 to the conveyer will be in definitely-timed relation to the traveling of the conveyer belts. As the forward end of a sheet leaves the feed rollers 12, it will enter between idler rollers 18 and the belts 8, and will also enter into the zone of magnetic influence of the magnets.

The magnets 7, 7a, 7b, etc. are energized by means of an electrical circuit 20, which contains an inductive resistance or choke coil 19 that prevents surge of current upon closing of the circuit, and it will be seen that the corresponding core of each magnet is connected to one of the longitudinally-extending pole pieces 23 and 23a, one of these pieces being the north pole and the other the south pole, as shown more clearly in Fig. 2. The two poles of each magnet are spaced apart in a direction transversely of the conveyer, and a series of these magnets are provided along the length of the conveyer.

It will be seen that the sheet thus bridges the space between the poles of each magnet and serves to complete the magnetic circuit. This arrangement prevents localizing of the magnet forces upon very limited areas or spots of the sheet and not only results in greater holding force by magnets of a given capacity but is particularly suitable for handling thin sheets of metal which would tend to sag, unless the magnetic forces are well distributed.

The position of the north and south poles of each magnet with respect to the north and south poles of the adjacent magnet may be reversed, and the pole pieces 23 and 23a eliminated or divided into sections, thereby causing the advancing sheet to complete the magnetic circuit in a transverse and a longitudinal direction.

Each sheet as it approaches the discharge end of the conveyer will engage, at its forward edge, with a switch 21 and break the circuit 20, thus effecting de-energization of those magnets that are in the circuit 20 and permitting the sheet to fall upon a supporting platform or receiving table 22. If long sheets are being handled, all of the magnets may be controlled by the switch 21, while for shorter sheets, those magnets near the receiving end of the conveyer will be continuously energized and those near the discharge end thereof be controlled by the switch 21. As soon as a sheet has been released by the magnets, it will fall to the table 22 and the switch 21 will be permitted to again close, so that the magnets may be energized to support the following sheet. The magnets are of course stationary and have the pole pieces at their lower ends against which the belt flights bear during their travel.

The depositing of the sheets in a vertical direction avoids scratching and marring thereof that would occur if they were simply discharged from the end of the conveyer in a generally horizontal direction. The conveyer is tiltable about its axis 17 by means of suspension members or cables 24 that pass through guiding sheaves 25 at the upper ends of the frame members 4 and have their ends secured to the frame members 5 and to the drums 26, so that when the drums are operated to wind up the cables 24 the outer end of the conveyer will be elevated to permit of convenient removal of the table 22 with the sheets contained thereon by means of a crane.

This feature is also desirable where the conveyer receives sheets directly from the rolling mill rolls, to permit access to such rolls for the purpose of polishing, etc. The actuation of the drums 25 to raise and lower the boom frame members 5 is effected through worm gearing 27 that is driven from a shaft 28. The shaft 28 has driving connections through a bevel gear 29 with bevel gears 30. Clutch members 32 are selectively movable into driving engagement with one of the bevel gears 30 depending upon whether it is desired to raise or lower the conveyer.

The gear wheels 30 are mounted upon a shaft 33 that is driven from a sprocket wheel 34 that is secured to the shaft 13.

We claim as our invention:—

1. Apparatus for conveying articles of magnetic material which comprises a plurality of magnets having a continuous pole piece of one polarity and a continuous pole piece of the opposite polarity, the pole pieces being disposed in parallel relation and spaced apart such distance that the said article will function to complete the magnetic circuit therebetween continuously throughout the forward movement of the article, and means for imparting traveling movement to the article.

2. Apparatus for conveying magnetizable material comprising a conveyer belt, a continuous pole piece of one polarity disposed in parallel relation with a continuous pole piece of the opposite polarity, a plurality of magnets for energizing said pole pieces, the said pole pieces extending longitudinally of the path of travel of said belt.

3. Apparatus for conveying sheets of magnetizable material, comprising a conveyer belt, a pole piece disposed above the belt and of a length not substantially less than the length of the sheets of material to be conveyed, and means for magnetizing said pole piece throughout its length for supporting said sheets against the underside of the belt.

4. Apparatus for conveying sheets of magnetizable material, comprising a conveyer belt, pole pieces disposed above said belt but in laterally-spaced relation to each other and being of a length not substantially less than the length of the said sheets, magnets for energizing said pole pieces with opposite polarities throughout their entire length, whereby a sheet will be supported against the underside of the belt, in position to form a portion of the magnetic circuit between the said pole pieces, and a yoke connecting said magnets and constituting another portion of the circuit.

In testimony whereof we, the said EDMUND W. SHINN, WILLIAM J. CROWLEY and ROBERT H. SCOTT, have hereunto set our hands.

EDMUND W. SHINN.
WILLIAM J. CROWLEY.
ROBERT H. SCOTT.